Jan. 22, 1952  G. ROUGELOT  2,583,496
GRADUAL CHANGE-SPEED GEAR WITH MULTIPLE FRICTION
Filed Jan. 10, 1948  5 Sheets-Sheet 1
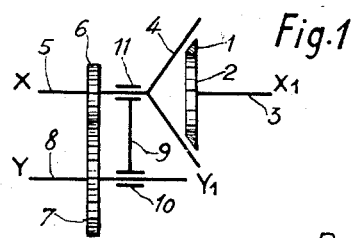
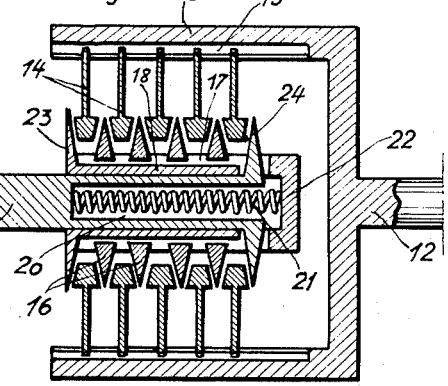
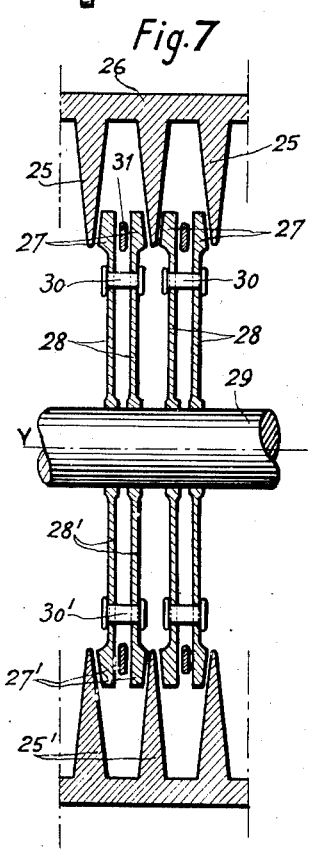
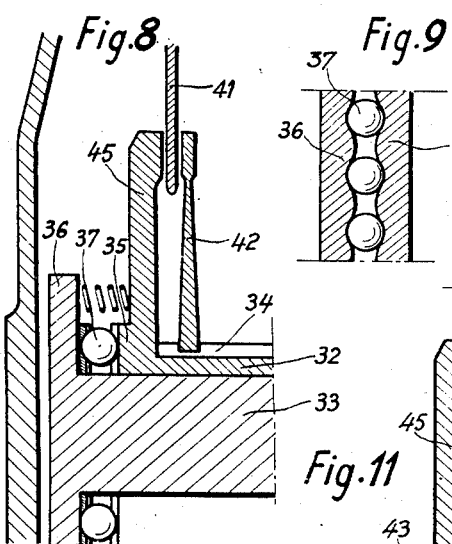
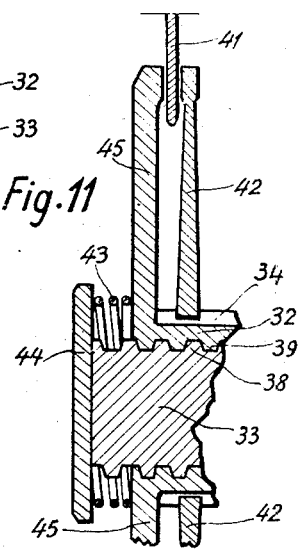
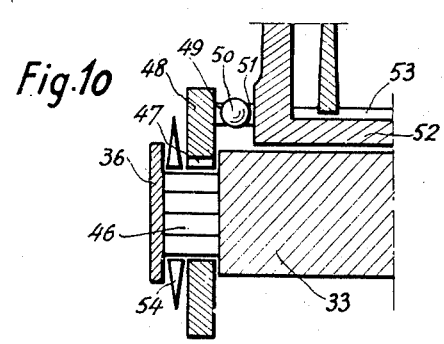
INVENTOR:
Guy ROUGELOT
Attorney Jan. 22, 1952        G. ROUGELOT        2,583,496
GRADUAL CHANGE-SPEED GEAR WITH MULTIPLE FRICTION
Filed Jan. 10, 1948        5 Sheets-Sheet 2
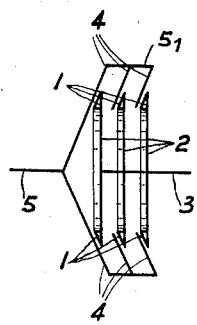
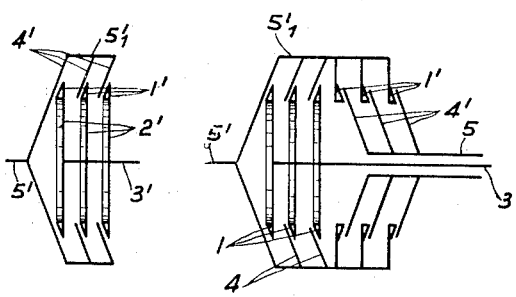
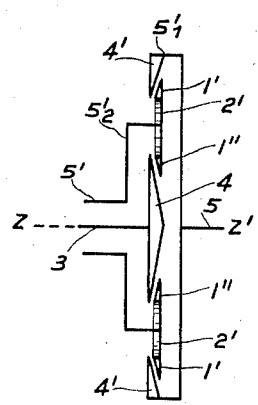
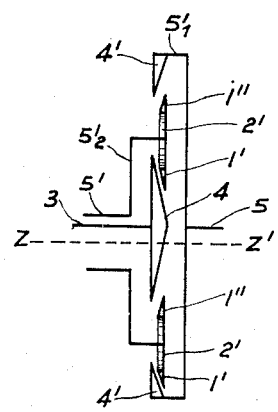
INVENTOR:
Guy ROUGELOT Jan. 22, 1952 G. ROUGELOT 2,583,496
GRADUAL CHANGE-SPEED GEAR WITH MULTIPLE FRICTION
Filed Jan. 10, 1948 5 Sheets-Sheet 3

INVENTOR:
Guy ROUGELOT
Attorney

Jan. 22, 1952   G. ROUGELOT   2,583,496
GRADUAL CHANGE-SPEED GEAR WITH MULTIPLE FRICTION
Filed Jan. 10, 1948   5 Sheets-Sheet 4
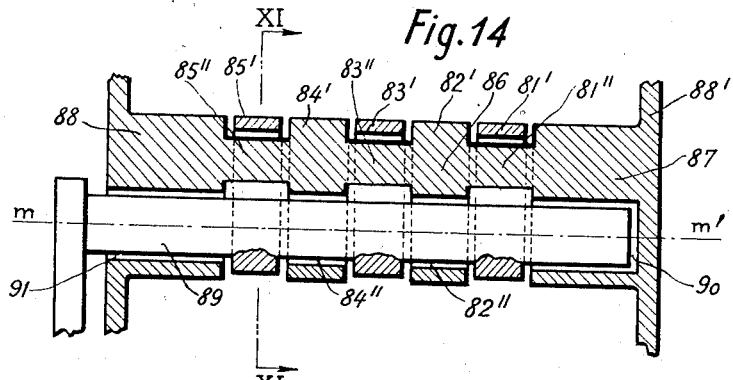
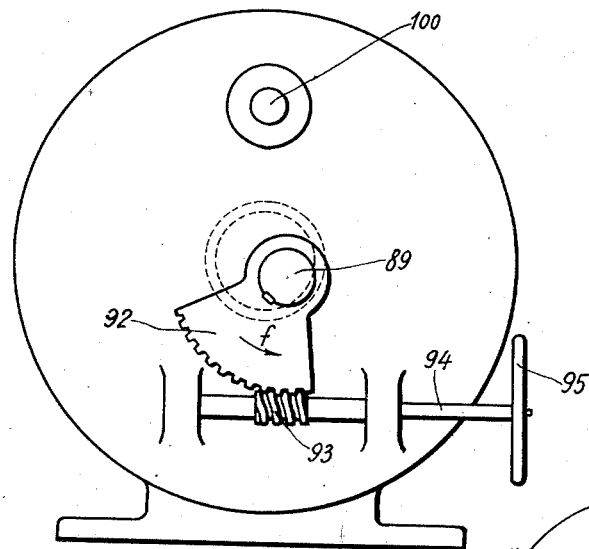
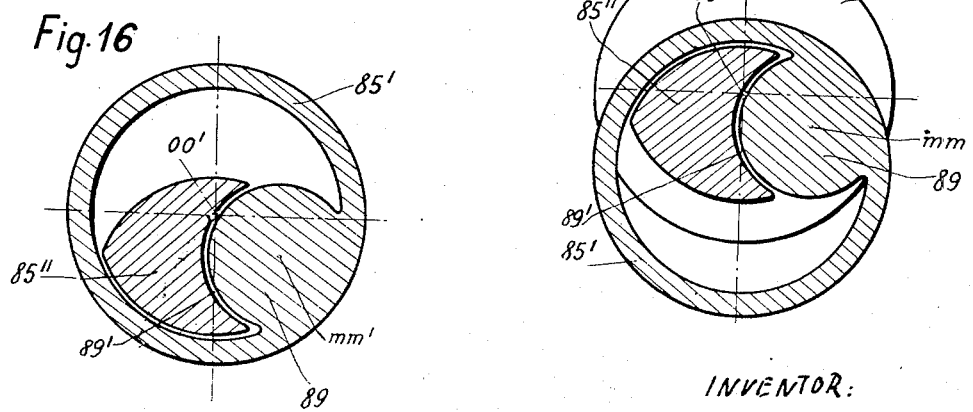
INVENTOR:
Guy ROUGELOT.
Attorney Jan. 22, 1952        G. ROUGELOT        2,583,496
GRADUAL CHANGE-SPEED GEAR WITH MULTIPLE FRICTION
Filed Jan. 10, 1948        5 Sheets-Sheet 5
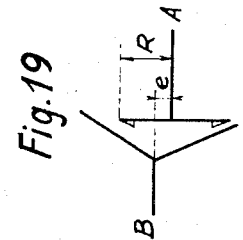
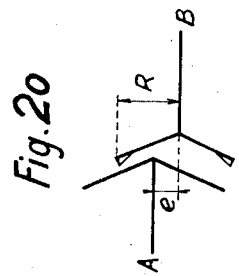
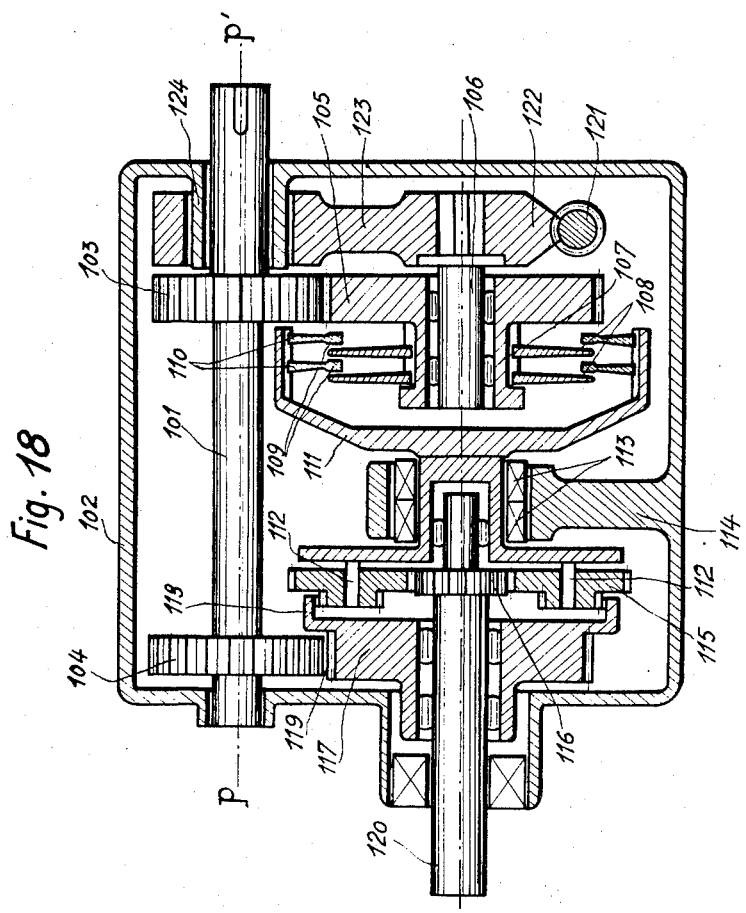
INVENTOR:
Guy ROUGELOT Patented Jan. 22, 1952

2,583,496

UNITED STATES PATENT OFFICE 2,583,496

GRADUAL CHANGE-SPEED GEAR WITH MULTIPLE FRICTION

Guy Rougelot, Enghein-les-Bains, Seine-et-Oise, France, assignor to Societe Algol, Agnetz, Clos Altair, France, a body corporate of France Application January 10, 1948, Serial No. 1,605
In France January 15, 1947

5 Claims. (Cl. 74—199)

Friction change speed gears are known which consist essentially of a roller keyed on the driving shaft and resting against a driven plate keyed on the driven shaft. But although this type of gear offers the advantage of consisting of simple components, it has the inconvenience of permitting only the transmission of small torque values.

Besides the systems with belt which have the inconvenience of direct friction and power limitation, one knows also automatic speed gear boxes of an improved design but which have only a limited number of stages. The problem which one has attempted to solve in using the latter devices instead of those mentioned above has been therefore incompletely solved.

The object of the present invention relates to a gradual change speed gear between a driving member and a driven member which remedies the inconveniences of the systems mentioned above and which shows with respect to the said systems the advantage of being simple, easily manufactured at a low cost and which avoids the wear for top gear permitting to transmit a value of the torque exceeding twenty times and over the torque which would be transmitted by a device of the customary type although its overall dimensions are not larger than those of the corresponding device of the customary type.

In a change speed gear according to the invention one of the driving or driven members carries a series of conical friction discs and the other member carries a series of conical friction rings, each of the said rings resting on a corresponding disc of the said series of discs the assembly being carried out so that the eccentricity between the discs and friction rings can be varied.

With advantage the angle at the apex of the conical friction discs will be very wide, in the neighborhood of a plane angle, in order to reduce the overall dimensions of the change speed gear, and the friction rings will belong to the part of a cone whose angle at the apex is equal to the aforesaid angle or very close to it.

By way of example an embodiment and some alternatives of a change speed gear according to the invention will be described hereinafter in conjunction with the accompanying drawings, wherein:

Fig. 1 is a diagrammatic representation of a change speed gear according to the invention but simplified to a degree to allow the invention to be stated more conveniently and comprising a single conical disc keyed upon one of the driving or driven shafts and a single conical ring keyed upon the other shaft, it being well understood that the disc and the ring are representing in this figure surfaces of revolution as besides in all the figures indicated further.

Fig. 2 is a diagrammatic representation of a change speed gear more complicated than that of Fig. 1.

Fig. 3 is a diagrammatical representation of an alternative for the change speed gear shown in Fig. 2.

Figs. 4 and 5 are diagrammatical representations of a more complicated combination, the change speed gear shown in Fig. 4 being directly driven and that in Fig. 5 showing the said gear with a certain eccentricity between the discs and the friction rings.

Fig. 6 shows diagrammatically a partial longitudinal section of another embodiment of the change speed gear shown in Fig. 2.

Fig. 7 shows diagrammatically a partial longitudinal section of a special embodiment of the friction rings.

Fig. 8 is a fragmentary sectional view of a change speed gear according to the invention comprising means to secure between the friction members a friction which is a function of the torque transmitted.

Fig. 9 illustrates a detail of Fig. 8.

Figs. 10 and 11 illustrate other embodiments applied to change speed gears according to the invention to secure between the friction members a friction which is a function of the torque transmitted.

Figs. 14, 15, 16 and 17 illustrate details of Fig. 13.

Fig. 18 is a sectional view section of the combination of a change speed gear according to the invention with a planetary device.

Figs. 19 and 20 are diagrammatic representatives of alternatives for an elementary friction device according to the invention.

Figure 12:
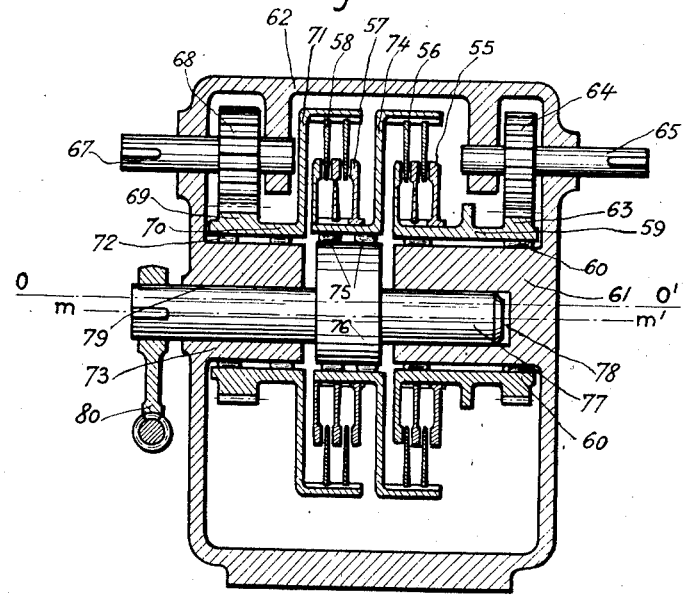
Fig. 12 is a sectional view of an embodiment of the change speed gear according to Fig. 2.

Referring to Fig. 1 which shows diagrammatically a change speed gear according to the invention. The representation of Fig. 1 is greatly simplified so that it can be readily recognized that the change speed gear comprises a conical rotary ring 1, fixed to a supporting disc 2 carried by a shaft 3 and that it rests upon the conical rotary disc carried by a shaft 5 coaxial with the first shaft upon which a toothed wheel 6 is also keyed meshing with another toothed wheel 7 keyed to shaft 8 rotating around an axis YY₁ parallel to axis XX₁ about which are rotating shafts 3 and 5; sleeves 10 and 11 carried by a rod 9 are engaged with shafts 8 and 5 respectively.

Assume now, that shaft 3 is the driving shaft and shaft 8 the driven shaft: when conical ring 1 is put in contact by its outer surface with the inner surface of conical disc 4, through any appropriate means, the latter disc will be driven and will cause shaft 8 to rotate through the toothed wheels 6 and 8.

Shafts 3 and 5 being alined with axis XX₁ the speed of rotation of those two shafts will be the same and the speed of shaft 8 will depend on the ratio of toothed wheels 6 and 7. When those two wheels are identical the angular speed of the driven shaft 8 is equal to that of the driving shaft 3. In the latter case when the small rod 9 is rotated about axis YY₁, for instance in such a direction that shaft 5 and therefore the conical disc 4 are moving towards the plane of the sheet of paper, shaft 5 will have been displaced parallel to axis XX₁ at a distance $e$ from the latter and the conical disc 4 will be in contact with the conical ring only along a generating line of the said ring. While in the preceding case for direct driving, when the conical disc was coaxial with the conical ring 1 the ratio of the speeds was $$\frac{R}{R} = 1$$

R indicating the radius of the plate 2 and wheels 6 and 7 being assumed to be identical, the ratio between the speeds of the driving and driven shafts after the positioning of disc 4 in eccentric relation to ring 1 is equal to $$\frac{R}{R+e}$$

It thus can be seen that in this manner a simple change speed friction gear has been constituted without much encumbrance, in which the gradual change in the ratio between the speeds of the driving and driven shafts is obtained by placing of a friction member in eccentric relation with respect to the other, it being well understood that this eccentric displacement can be obtained by means of any appropriate means other than that indicated in Fig. 1 by way of example.

The outline dimensions of the change speed gear can be reduced by taking angle values in the neighborhood of 180° for the angles at the apices of the conical disc 4 and of the cone upon which is drawn the conical ring 1.

This is particularly interesting when the gradual change speed gear comprises, as shown in Fig. 2 (on the left hand), conical rings 1 carried by discs 2 keyed on shaft 3, each of which rests upon a corresponding conical disc 4 carried by a bell 5₁ which is secured to shaft 5 in its rotation. It can be seen that this device operates in the same manner as the elementary device shown in Fig. 1 and that it offers with respect to that device the advantage of transmitting a higher power, as the power transmitted by a system which comprises, as in the case of Fig. 2, several elementary devices arranged in parallel to each other is equal to the sum of the powers transmitted by each of the elementary devices.

One can conceive various combinations of discs and conical friction rings associated to constitute gradual change speed friction gears, each of these combinations being adapted to a particular use for changing speed.

For instance an identical device can be associated with a change speed gear according to the left hand side of Fig. 2 (on the right hand side of Fig. 2, the elements similar to those shown on the left hand are denoted by the same reference numbers marked with an index).

By making shaft 5' secured to shaft 3 in its rotation one constitutes a change speed gear by means of two parallel devices arranged in series and one can provide means on one or several of the shafts, the said means being not shown, but for instance analogous to those shown on Fig. 1, whereby the eccentric arrangement of one or several series of rings with respect to one or several series of conical discs is made possible, or conversely, the preferred arrangement being that in which shafts 5 and 3 are rotating about fixed common axis, the variation of speed is then obtained through the eccentric arrangement of shafts 3 and 5' which are secured to each other.

According to Fig. 3 illustrating another embodiment of the change speed gear according to the invention, the element which can be placed in eccentric relation and is secured to shaft 5' in its rotation is constituted by a bell 5'₁ carrying on its inner wall conical discs 4, some conical rings 1 cooperating with the said discs 4, and conical rings 1' being carried by shaft 3 which passes through a hollow shaft 5 which carries a series of discs 4' each of which carries a corresponding conical ring 1'. When shaft 5' is coaxial with shafts 3 and 5 the change speed gear is on direct driving and when shaft 3 constitutes the driving shaft and shaft 5 constitutes the driven shaft, the said two shafts will rotate at the same speed.

When an eccentric arrangement of the bell with respect to the axis of rotation of shafts 3 and 5 is produced through an analogous or equivalent device to that shown on Fig. 1, it will be possible as in all the embodiments previously described to obtain a gradual variation of the speed of rotation of the driven shaft 5 with respect to that of the driving shaft 3.

Finally Figs. 4 and 5 show another embodiment for a change speed gear constituted by means of discs and conical rings which is particularly adapted for use in devices for which only a rather narrow space is available between the driving and driven shafts. Fig. 4 shows the change speed gear in the direct drive position and Fig. 5 shows the same gear after the positioning of the displaceable member in its eccentric position.

With reference to Fig. 4 it can be seen that this change speed gear is constituted as follows: Shaft 5 carries a bell 5'₁, on the inner cylindrical wall of which are fitted conical discs 4' (one of them only has been shown in order not to congest the drawing) and shaft 3 lined with shaft 5 carries on its extremity housed in bell 5'₁, a conical disc 4. Discs 4' and 4 are coming in contact respectively with conical rings 1' and 1'' arranged respectively on the inner and outer periphery of a circular crown 2' secured by appropriate means (not shown) at the end of a bell 5'₂ which is itself secured in its rotation to a hollow shaft 5' and which is shrunk on shaft 3.

Assuming that shaft 5 is a driving shaft it will cause bell 5'₁ to rotate and also therefore will cause conical disc 4' which in turn will drive by friction crown 2' whose conical ring 1'' will drive the driven shaft 3 through friction with conical disc 4. Shafts 5, 5' and 3 rotating around axis Z—Z' of shaft 5' the change speed gear is in the direct drive position and the angular speed of the driven shaft 3 is equal to that of the driven shaft 5.

When through any appropriate means, for instance some means similar or equivalent to that shown in Fig. 1, shaft 5' is displaced parallel to the axis common to the driving shaft 5 and driven shaft 3 so that, for example, the axis of shaft 5' comes into the position Z—Z' as shown in Fig. 5, an eccentricity is obtained which gives a speed ratio between shafts 5 and 3 other than 1:1, the said ratio depending, as has been explained above in connection with the elementary change speed gear, on the distance between the axis Z—Z' and the axis common to shafts 5 and 3.

A particularly interesting embodiment for a change speed gear using a parallel arrangement for elementary systems, analogous to that shown in Fig. 2 (left or right handed part) is that shown in Fig. 6 wherein one of the driving or driven shafts, i. e., shaft 12, carries a bell 13 in the longitudinal grooves 15 of which are sliding biconical rings 14 which rest upon biconical rings 14 which are themselves resting upon biconical friction discs 16 sliding longitudinally in axial grooves 17 of a socket 18 shrunk upon shaft 19 provided with a recess 20, a spring 21 being housed in the said recess and resting upon the bottom 22 of the said socket. Besides the biconical discs such as 16, the socket carries a conical disc 23 secured on the said socket, a like disc 24 being carried by shaft 19 near the other end of the socket.

Assuming, to situate the facts, that 19 is the driving shaft it drives socket 18 secured by appropriate means (not shown) on this shaft, and the said socket drives the sliding biconical discs 16 and conical disc 23, the conical disc 24 being itself driven by shaft 19. When a thrust P is applied to shaft 19, it is transmitted by spring 21 to the socket which is displaced towards the right. The conical disc 23 comes then to rest upon the adjacent biconical ring 14 and transmits the said thrust to it. This biconical ring slides in grooves 15 and comes to rest upon the next biconical disc to which it transmits the said thrust. The latter disc in turn slides in groove 17 and comes to rest upon the second biconical ring 14 to which it transmits the said same thrust which from the discs to the succession of rings is transmitted towards the right up to the disc 24 secured on shaft 19. That friction disc receives a thrust from the last piece, such as 16, and that thrust is equal to that exerted by disc 23 on the first disc such as 16 and due to the action of spring 21. Accordingly shaft 19 through spring 21 receives therefore a thrust equal and opposite to the thrust it receives from the last disc 24. Those two thrusts are cancelling each other and the shaft is finally subjected to no thrust.

It should be noted that the biconical rings sliding in the grooves such as 15 do not transmit any axial thrust to the bell 13 and accordingly to shaft 12.

When it is desired to double the variation obtained with a change speed gear such as described above, it is sufficient to fit on the left end of shaft 19 a bell similar to bell 13 and provided with biconical rings such as 14 which will drive similar discs such as shown in 16 in Fig. 6 which in turn will drive a socket similar to socket 18 secured in its rotation to a shaft playing the same function as shaft 19. In this manner a complex double change speed gear will have been obtained exactly as in Fig. 2 which is constituted by two change speed gears in series for which the driven output shaft of the first gear box constitutes the input driving shaft of the second. The complex change speed gear obtained according to Fig. 6 shows with respect to that of Fig. 2 the advantage of suppressing any axial thrust on the various friction elements, which thrust, if it were existing would cause some deformations on the said friction elements.

When it is desired to obtain a speed ratio differing from unity between shafts 19 and 12 with the change speed gear shown in Fig. 6, it will be sufficient to provide for shaft 19, for instance, a device capable of providing an eccentric arrangement similar to the device shown in Fig. 1 or carried out in any other appropriate manner.

When it is desired in the embodiment of the change speed gear of Fig. 6 to avoid the use of sliding pieces such as 14 and 16 it will be possible to embody this device as shown diagrammatically in Fig. 7 and which is limited to three friction discs. These discs 25 are secured to the bell 26 or cast with it and each biconical ring 14 on Fig. 6 is now replaced by a set of two conical rings 27 each fitted on a flexible disc 28 secured in its rotation to shaft 29. An elastic element such as 31 is fitted between two conical rings 27 of the same set of flexible discs 28 and two flexible discs 28 of the same set are connected to one another by braces 30.

When shaft 29 is eccentered in such a direction that it moves upward for instance, the parts 27 of two conical rings of a same set and which are lying above the shaft are getting nearer to one another against the action of the elastic element 31. Besides, owing to the action of braces such as 30 and 30', the rings cannot in any way move apart, particularly in the part 27' of the said rings which lies beneath shaft 29 where such parting might have the tendency to take place owing to parts 27 getting nearer to one another. Finally the contact between rings 27 and conical surfaces such as 25 takes place only in the region 27 where rings are subjected to crushing and one is thus brought back to the case of Fig. 6.

According to an alternative embodiment the action through which two friction rings of a same set are brought together is opposing that of springs (not shown) fitted on the brace and resting against discs 28.

According to the present invention, the change speed gear may be provided with a known centrifugal device which will ensure a pressure between the friction elements, the said pressure being a function of speed, or with a device which for the same purpose will make use of the torque itself which is transmitted by the change speed gear, or of the resisting torque, preferably a ramp with balls, a helical reversible slope or a system of small rods.

Fig. 8 shows partially and diagrammatically a change speed gear of the same kind as that shown on Fig. 6; conical friction discs 41 sliding now in the bell (not shown) and biconical rings 42 sliding in the socket 32. The latter is loose on shaft 33 and can also move axially on the latter in a known manner not shown. The said socket is provided with a groove 34 in which biconical rings 42 can slide, the said rings resting against the corresponding friction discs 41 which themselves are sliding in grooves (not shown) on the bell. The end 35 of socket 32 and end 36 of shaft 33 are constituting rolling tracks for balls such as 37 and the said tracks are constituted by ramps with opposite slopes (see detail on Fig. 9). It thus can be seen that this ball rolling track is used not only for driving socket 32 but also to move it toward the right as soon as a relative rotating motion takes between those two tracks, the said displacement towards the right reinforcing the pressure between the various friction elements.

The use of a reversible helical ramp is shown in Fig. 11. In this case shaft 33 carries a helical thread 38 on which the socket 32 is screwed being provided with a corresponding tapping 39. It can be seen that in the same manner as for the embodiment described above when the torque is varying, a rotating relative motion takes place between shaft 33 and socket 32 and that the latter screws or unscrews itself on the tap according to the direction of the variation of the torque thereby leading to an increased or decreased pressure between the various friction surfaces. Pressure at the time of starting between discs 41 and biconical rings 42 is ensured by a spring 43 which rests on one hand on plate 44 secured to shaft 33 or cast with it in one single piece, and on the other hand, on the friction disc 45 (similar to disc 23 on Fig. 6) fitted on socket 32 or cast with it in one single piece.

It may occur in certain cases that the resisting torque is too high; a too strong thrust will then (see embodiment on Fig. 8) take place on discs 41. To remedy this inconvenience the change speed gear will be then embodied as shown in Fig. 10. In the said figure it can be seen that the change speed gear which is shown thereon differs from that shown in Fig. 8 by the fact that between plate 36 and balls 50 (which correspond to plate 36 and balls 37 of Fig. 8) the shaft 33 in Fig. 10 is provided with a length 46 whose diameter is reduced and provided with grooves 46 and on which is shrunk a corresponding disc 48 which is itself grooved at 47 and which can move axially on the part of shaft 33 reduced in diameter and which causes a rotation thereof. On its face directly toward the friction members of the change speed gear, the said disc 48 carries one of the rolling tracks 49 with opposing ramps, the said track being analogous to that shown at 36 in Fig. 9 for the balls 50, the second rolling track 51 (analogous to that shown at 35 in Fig. 9) being carried by socket 52 loose on shaft 33 and which is provided with a groove 53 in which, as described previously, are sliding the supports of the friction rings (not shown).

Between disc 48 and plate 36 an elastic washer 54 or any other appropriate member is provided which reduces the thrust on the friction cones to the pressure which the said washer can withstand. Thus, if the said elastic washer is designed to withstand a maximum pressure of, say 1.000 kgs., the change speed gear will operate normally as long as the balls 50 are not developing a pressure higher than 1.000 kgs. For high pressures which are transmitted through the balls to disc 49 and through the disc to the washer, the said elastic washer will give way. The disc 49 will then move apart from the socket 52 and the thrust exerted on the friction members will decrease. When required the axial displacement of the disc 48 can operate such electrical appropriate devices adapted for cutting off the motor supply (not shown) and which is driving shaft 33.

In any of the cases mentioned above (ramps with balls, reversible helical ramps) each change speed gear will include a spring which on starting will ensure a pressure between the rings and the friction discs for the transmission of the torque, the said spring may besides be replaced by an equivalent electrical or pneumatic device.

Fig. 12 shows a longitudinal sectional view of an embodiment of a change speed gear in which an intermediate member is arranged as mentioned above between the series of conical discs and the series of friction discs of the change speed gear, the said member comprising on one hand a series of friction discs cooperating with the rings of the said change speed gear and on the other hand a series of friction rings cooperating with the discs of the said gear, the said intermediate member being capable of being displaced into eccentric position for the purpose of obtaining the variation in speed.

According to Fig. 12, the change speed gear comprises essentially the friction rings 55 cooperating with discs 56 and rings 57 cooperating with discs 58. Rings 55 are driven in rotation around axis O—O' of the change speed gear by a socket 59 mounted with ball rollers 60 on trunnion 61 of casing 62 by means of a toothed wheel 63 fitted on the said socket or cast with it and meshing with a toothed wheel 64 mounted on shaft 65 which may be considered, to situate the facts, as the input shaft.

The output shaft 67 carries a toothed wheel 68 meshing with a toothed wheel 69 similar to wheel 63 and the sleeve 70 of which (the said sleeve corresponding to sleeve 59) carries a bell 71 driving the discs 58 just as bell 13 shown in Fig. 6 is driving friction rings 14. The sleeve 70 is mounted upon trunnion 73 of casing 62 with interposed ball rollers 72.

The discs 56 and rings 57 of the intermediate member are carried by a double bell 74 shrunk upon a roller 76 with interposed rollers 75, the said roller 76 being fitted with an eccentricity upon the shaft 77, rotating in bores 78 and 79 for trunnions 61 and 73 around axis $m—m'$ and being distinct from axis O—O' and parallel with it.

In the position shown in Fig. 12, the location of roller 76 is such that the speed of shaft 67 is equal to that of shaft 65. Should it be required to obtain a speed ratio other than 1:1, lever 80 which is fitted at the end of shaft 77 will be turned by means of an endless screw 80', the rotation of the said lever leading to a corresponding rotation for the eccentered roller 76 which will displace the friction elements 56 and 57 with respect to the corresponding friction elements 55 and 58, thereby permitting to obtain the required change in speed.

It should be well understood that for obtaining this displacement the various friction members should have an axial freedom of movement in their respective supports in which for instance they may be slidable in longitudinal grooves provided to this effect, as described and shown in Fig. 6. Furthermore it will be possible for this embodiment of the change speed gear to adopt either one of the devices described above and which are intended to secure a thrust which is a function of the torque.

Figure 13:
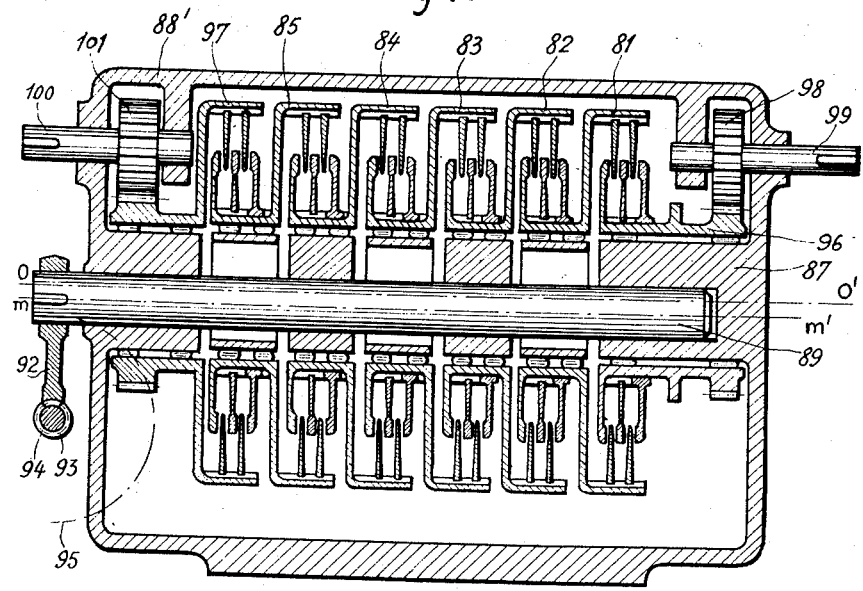
Fig. 13 is a sectional view of another embodiment of a change speed gear, similar to that shown in Fig. 12, which, however, is equipped with a plurality of intermediate elements.

Fig. 13 shows diagrammatically a form of embodiment of the change speed gear similar to that shown in Fig. 12 but comprising 5 intermediate elements in the shape of a double bell 81 to 85, the arrangement being such that the rotation of shaft 89 trunnioned in bosses 87 and 88 of casing 86 around its axis $m—m'$ parallel with the axis of symmetry O—O' of the machine and distinct from it causes the eccentric positioning of bells 81, 83 and 85 when the speed of the output shaft is varying with respect to that of the input shaft.

Fig. 14 shows the detail of the arrangement of the device for causing the eccentricity. In that figure the double bells 82 and 84 (see Fig. 13) are mounted respectively with interposed ball rollers on the cylindrical parts 82' and 84' of a rigid body 86 connecting the two trunnions 87 and 88 of casing 88' of the change speed gear. The double bells 81, 83 and 85 are mounted respectively with interposed ball rollers on rings 81', 83' and 85' which are surrounding respectively parts 81'', 83'' and 85'' with a reduced diameter of the rigid body 86 connecting trunnions 87 and 88. A shaft 89 trunnioned in bores 90 and 91 for trunnions 87 and 88 of casing 88' passes through bores 84'' and 82'' of cylindrical parts 84' and 82' and it is fitted in an appropriate manner on the inner face of each of the rings 81', 83' and 85'. At one of its ends, shaft 89 is projecting outside the casing and carries a toothed segment 92 meshing with an endless screw 93, mounted on a rod 94 trunnioned in an appropriate manner in the casing and operated by a hand-wheel 95 (see Fig. 15).

In the position shown in Fig. 13, the ensemble of bells 81 to 85 and of outer elements 96 to 97 rotate about axis O—O' and the speed ratio between the shafts 99 and 100 is equal to one. (The first of these outer elements is driven by the toothed wheel 98 keyed upon the input shaft 99 and the second controls the rotation of the output shaft 100 through toothed wheel 101 keyed upon the latter shaft.) In this position when one considers the transverse section XI—XI on Fig. 14 shown on Fig. 16, the cylindrical discs 82' and 84' as well as rings 81', 83' and 85' are alined upon axis O—O'. In order to obtain a change in speed, the hand wheel 95 (Fig. 15) is turned in such a direction that segment 92 is displaced in the direction of arrow, driving shaft 89 which in its rotation about $m-m'$ drives rings 81', 83' and 85' which are thus occuping the eccentered position shown on Fig. 17. Exactly as in the case described in connection with Fig. 12 the various friction elements can slide in their respective bells and means can be provided for securing between the two cooperating elements a pressure which is a function of the torque transmitted by the change speed gear.

As it can be seen in Figs. 16 and 17, parts 81'', 83'' and 85'' of the rigid element 86 connecting the transverse section of the two casing trunnions 87 and 88 should preferably be ogival in shape and ending with a circular part 89' constituting the sliding surface for shaft 89. Other mechanical devices may be easily conceived for obtaining this eccentricity relative to the center.

Fig. 18 shows the combination of a change speed gear according to the invention with a planetary device.

It can be seen that this ensemble comprises a driving shaft 101 trunnioned in casing 102 and carrying two toothed wheels 103 and 104. The toothed wheel 103 meshes with the toothed wheel 105 mounted with interposed ball rollers on shaft 106 and ending by a socket 107 carrying the friction discs 108 which can slide axially upon the said socket owing to a groove (not shown) similar to that provided in the device shown in Fig. 6. Those friction discs 108 cooperate with friction rings 109 the supports 110 of which are driven by bell 111 keyed with the satellite carrier arms 112 and the assembly formed by bell 111 and the satellite carrier arms 112 rotates upon rollers 113 housed in a boss 114 of casing 102. Satellites 115 driven by arms 112 mesh with the toothed wheel 116 keyed on the outgoing shaft of the apparatus the said shaft carrying in a known manner an inner toothed crown 118 and an outer toothed crown 119. Crown 118 meshes with satellites 112 and outer crown 119 meshes with toothed wheel 104 keyed on the driving shaft 101. It can be seen that when the diameter of the toothed wheel 116 and that of the inner crown 118 are properly chosen one obtains on the output shaft 120 a much larger change in speed than on the output shaft of the change speed gear by friction, or in other words, the change in speed in the said friction gear is obtained by the means indicated above, for instance by eccentric positioning of the toothed wheel 105 which is obtained by pivoting the said toothed wheel about axis $p-p'$ of shaft 101. In the forms of embodiment shown in Fig. 18 the said pivoting is obtained by driving an endless screw 121 meshing with the toothed part 122 of a lever 123 which is trunnioned freely at 124 on casing 102 concentric with axis $p-p'$ and itself carrying shaft 106 of toothed wheel 105.

In the device shown in Fig. 18 the change speed gear transmits to the satellite-carrier 112 a speed of rotation equal to that of the toothed wheel 105 or lower. By interchanging the members of the change speed gear one can on the contrary obtain a device in which the satellite-carrier 112 will receive through the change speed gear a speed equal to that of toothed wheel 105 or higher.

Referring to Fig. 1 it can be seen that conical surfaces 1 and 4 have their apices located on the left. The elementary change speed gear shown therein as besides all the other embodiments described, can be constituted with conical surfaces having their apices located on the right. Figs. 19 and 20 show diagrammatically such arrangements and it can be seen easily that although it is based upon a like principle the change in speed for the same eccentration varies according as one uses the mechanism of Fig. 19 or that of Fig. 20.

Thus, let R be the radius of the contact circle at the instant input shaft A and outgoing shaft B are alined, that is when the change speed gear is on direct drive, and let e be the distance between both shafts after eccentration, the ratio between the input and output speeds in the case of Fig. 19 is equal to $$\frac{R}{R+e}$$

In the case of Fig. 20 it is equal to $$\frac{R-e}{R}$$

A comparison between those two ratios shows that for the same e the second ratio is smaller than the first. Accordingly if one wishes to obtain a strong speed variation it is of advantage to constitute the friction elements as shown in Fig. 20. In the change speed gear with multiple friction to which relates the present application, the position of the direct drive giving an output speed which is the same as the input speed is lying at the extremity of the range of variation which affords an interesting possibility for obtaining a wider variation. For instance assume a change speed gear with a speed ratio 4 which gives on the output shaft all the speeds included between the input speed and a quarter of that same speed. When the change speed gear through a clutching or declutching device is used as a multiplier instead of a demultiplier a new range of output speeds will be obtained between the input speed and four times that input speed.

What I claim is:

1. A power transmitting apparatus comprising in combination a driving shaft, a first element operatively connected to said driving shaft and having a series of friction rings slidably mounted thereon, a driven shaft in axial alignment with the said driving shaft, a second element operatively connected to said driven shaft and having a series of friction discs slidably mounted thereon, means connecting said first and second elements, said means including an intermediate element having a series of conical friction discs slidably mounted thereon and having a series of conical friction rings slidably mounted thereon, the friction discs of said intermediate element being positioned in cooperative relationship to friction rings of said first element and the friction rings of said intermediate element being positioned in cooperative relationship to the friction discs of said second element, means operatively engaged with said slidable friction discs and rings for engaging same with each other so as to transmit power from the driving shaft to the driven shaft, and means for varying the radial position of said intermediate element with respect to said first and second elements.

2. A power transmitting apparatus comprising in combination a driving shaft, a first element operatively connected to said driving shaft and having a series of friction rings slidably mounted thereon, a driven shaft in axial alignment with the said driving shaft, a second element operatively connected to said driven shaft and having a series of friction discs slidably mounted thereon, a row of intermediate elements, each intermediate element having a series of conical discs slidably mounted thereon and having a series of conical friction rings slidably mounted thereon, the friction discs of said intermediate elements, with exception of the intermediate element at one end of said row, being positioned in cooperative relationship to the friction rings of the adjacent intermediate element, the friction rings of said intermediate elements, with exception of the intermediate element at the other end of said row, being positioned in cooperative relationship to the friction discs of the adjacent intermediate element, the friction discs of the intermediate element at the first mentioned end of the row being positioned in cooperative relationship to the friction rings of said first element, the friction rings of the intermediate element at said other end of the row being positioned in cooperative relationship to the friction discs of said second element, means operatively engaged with said slidable friction discs and rings for engaging same with each other so as to transmit power from the driving shaft to the driven shaft, and means for varying simultaneously and to the same extent the radial position of the intermediate elements of odd rank with respect to the intermediate elements of even rank and with respect to said first and second elements.

3. A power transmitting apparatus comprising in combination: a driving shaft, a first element operatively connected with said driving shaft and having a series of conical friction rings slidably mounted thereon, a driven shaft in axial alignment with said driving shaft, a second element operatively connected with said driven shaft and having a series of conical friction discs slidably mounted thereon, an odd number of intermediate double-bell-shaped elements having each a series of slidably mounted conical friction discs and a series of slidably mounted conical friction rings, the friction discs of one element projecting between the friction rings of the adjacent element, means operatively engaged with said slidable friction discs and rings for engaging same with each other so as to transmit power from the driving shaft to the driven shaft, and means for varying simultaneously and to the same extent the radial position of the intermediate elements of odd rank with respect to the intermediate elements of even rank and with respect to said first and second elements.

4. A power transmitting apparatus comprising in combination: a driving shaft, a first element operatively connected with said driving shaft and having a series of conical friction rings slidably mounted thereon, a driven shaft in axial alignment with said driving shaft, a second element operatively connected with said driven shaft and having a series of conical friction discs slidably mounted thereon, a rigid element extending from the first to the second element and having an odd number of annular grooves and an annular shoulder between each pair of adjacent grooves, annular rings mounted in the annular grooves, a rod rotatably supported in said rigid element around an axis distinct from the longitudinal axis thereof and fastened with the rings lodged in the grooves, a double-bell-shaped intermediate element rotatably mounted on each of said rings and shoulders, each of said double-bell-shaped intermediate elements having a series of conical friction rings and a series of conical friction discs slidably mounted thereon, the series of conical friction discs of an element projecting between the friction rings of the adjacent element, means operatively engaged with said slidable friction discs and rings for engaging same with each other so as to transmit power from the driving shaft to the driven shaft, a toothed sector carried by one end of said rod, a rotatively supported helical worm in mesh with the toothed sector, and a control wheel carried by said worm.

5. A power transmitting apparatus as claimed in claim 1, wherein the portions of the rigid element at either side of the annular shoulders have an ogival section with a circular bearing portion for the rotatably supported rod.

GUY ROUGELOT.

REFERENCES CITED

The following references are of record in the file of this patent:

UNITED STATES PATENTS

| Number | Name | Date |
| --- | --- | --- |
| 1,823,226 | Abbott, Jr. | Sept. 15, 1931 |